ELECTRONIC SWITCHING SYSTEM

Filed Aug. 4, 1965

INVENTOR
ERNEST F. HASELTON, JR.
BY Stanley M. Schurgin
ATTORNEY

March 25, 1969 E. F. HASELTON, JR 3,435,417

ELECTRONIC SWITCHING SYSTEM

Filed Aug. 4, 1965 Sheet 2 of 4

INVENTOR
ERNEST F. HASELTON, JR.

BY Stanley M. Schlosser

ATTORNEY

INVENTOR
ERNEST F. HASELTON, JR.
BY
ATTORNEY

INVENTOR
ERNEST F. HASELTON, JR.
BY
Stanley M. Schurgin
ATTORNEY

United States Patent Office 3,435,417

Patented Mar. 25, 1969

3,435,417

ELECTRONIC SWITCHING SYSTEM

Ernest F. Haselton, Jr., West Concord, Mass., assignor to Sylvania Electric Products Inc., a corporation of Delaware Filed Aug. 4, 1965, Ser. No. 477,166

Int. Cl. H04q 3/00

U.S. Cl. 340—166 10 Claims

ABSTRACT OF THE DISCLOSURE

A parallel hold technique is employed to maintain the closure of relay crosspoints while retaining the series control aspect of existing switching networks. The parallel hold connection through the network is provided by employing diodes connected between the relay control coils and the switching system hold lines and by connecting each relay control coil between a selected control line and a point of reference potential.

This invention relates generally to switching systems, and more particularly to relay controlled switching systems having a conferencing capability.

Communications switching systems often employ relays having pull and hold coils to establish the requisite crosspoint connections which interconnect the desired parties. Generally, the respective pull and hold coils are connected in series to minimize the number of control points which must be addressed to establish a particular connection. When such circuits are employed to conference more than two parties, additional current is drawn through one or more of the hold coils. The number of conferees that can be interconnected by these conventional techniques is, therefore, limited by the amount of current which the hold coils can carry. Thus, hold coils must be designed to operate over a relatively wide current range in order to function for two party calls as well as for multiple party conference calls. The additional cost and non-standard consturction of such coils makes such a conferencing technique unattractive and has led to the use of separate conferencing networks.

By use of these separate conferencing networks, a conference call is established by connecting a calling party to the conferencing network and connecting this network to the other conferees by additional conferencing circuitry suitably interconnected into the switching network. Conferencing by this technique is accomplished at the expense of additional switching networks, used only in establishing conference interconnections.

In many instances, for example in a private branch exchange, it is desirable for reasons of economy, to have a system with a conferencing capability built into the main switching network. At the same time it is required that such a system be compatible with existing switching systems.

It is, therefore, a general object of the present invention to provide a switching system having a built in conferencing capability.

Another object of this invention is to provide a switching network having a built in conferencing capability which is compatible with existing switching systems.

Briefly, the invention utilizes a parallel hold technique to maintain closure of the relay cross-points, but retains the series control aspects of existing switching networks. The series control connection through the network is provided by using diodes connected between the relay control coils and the switching system hold lines, thereby retaining compatibility with existing systems.

The foregoing and other objects, features and advantages of the invention and a better understanding of its construction and operation will become apparent from the following detailed description, taken in conjunction with the accompanying drawings, in which.

Figures 1, 2:
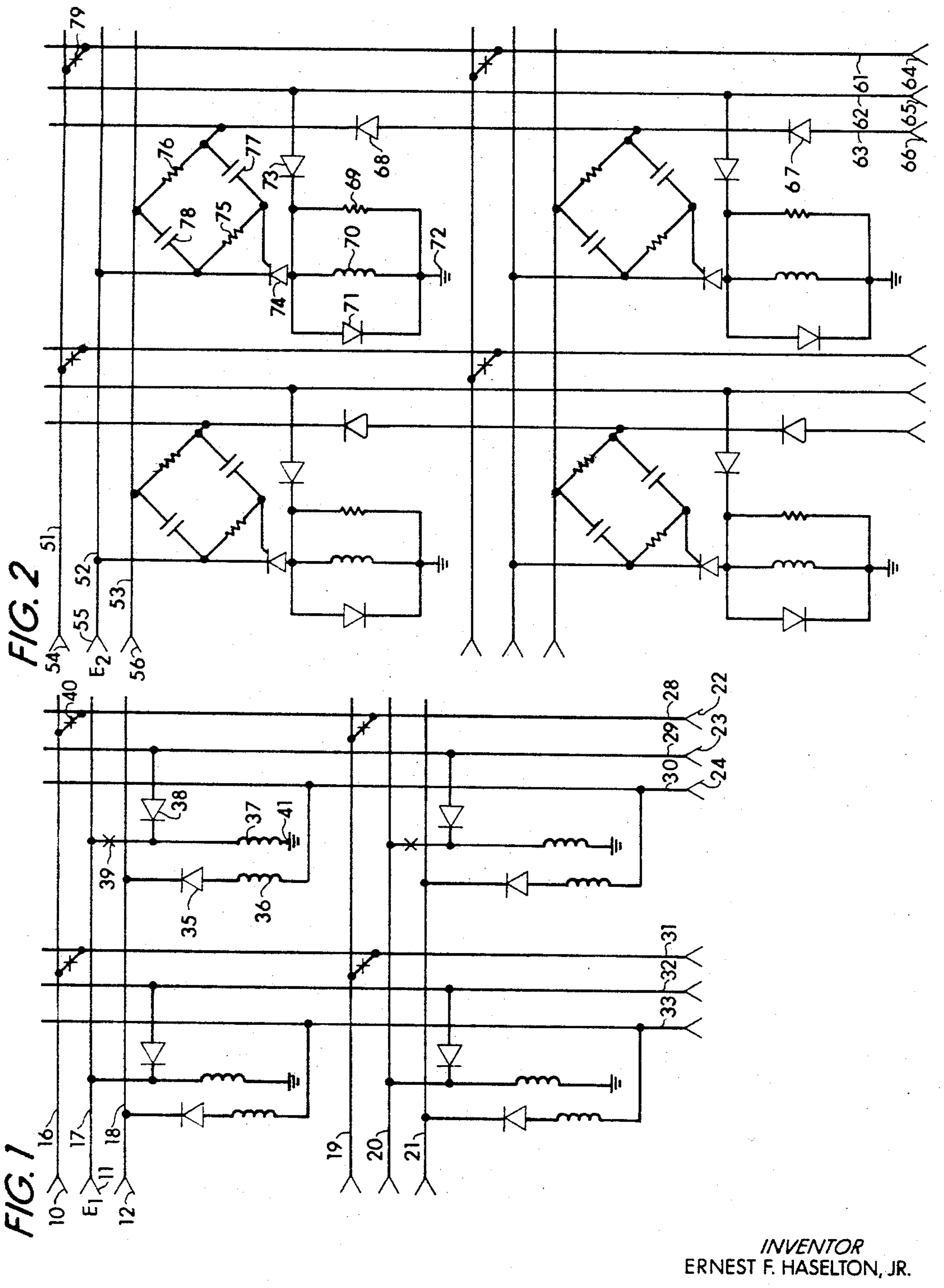
FIG. 1 is a schematic circuit diagram of a 2 x 2 switching matrix according to the invention.
FIG. 2 is a schematic circuit diagram of a second embodiment of a 2 x 2 switching matrix according to the invention.

FIG. 1 illustrates a 2 x 2 switching matrix of generally conventional form but with the relay hold coil connected between an input hold line and ground, rather than between an input hold line and an output hold line. Although a 2 x 2 switching matrix is illustrated, it will be evident from the following description that the invention is applicable to any M x N matrix. Referring to FIG. 1, the matrix consists of two sets of horizontal conductors, the upper set consisting of three lines 16, 17 and 18, and the lower set including three lines 19, 20 and 21, and two sets of vertical conductors, one set consisting of three lines 31, 32 and 33, and the other comprising lines 28, 29 and 30. Each set of conductors represents a link of a potential transmission path, and since the two sets of horizontal conductors intersect the two sets of vertical conductors in four places, there are four possible transmission paths through the matrix. A relay switching circuit is associated with each intersection of horizontal and vertical sets of lines. For example, at the intersection of horizontal lines 16, 17 and 18 with vertical lines 28, 29 and 30, there is a relay switching circuit consisting of a pull coil 36, a hold coil 37 and relay contacts 39 and 40. A diode 35 is connected between lines 18 and one end of the relay pull coil 36, the other end of the pull coil being connected to vertical line 30. The relay hold coil 37 is connected between one side of the relay contacts 39 and a point of ground reference potential. The other side of the relay contacts 39 is connected directly to horizontal line 17. A second diode 38 is connected between the top of the relay hold coil 37 and vertical line 29. Relay contacts 40 are connected between horizontal line 16 and vertical line 28. As mentioned above, an identical switching circuit is associated with each of the three remaining intersections of sets of horizontal and vertical lines. In addition, in the switching matrices, a source of energizing or holding potential is directly connected to the middle conductor of each set of horizontal conductors. For example, the source of holding potential $E_1$ is connected to input terminal 11 associated with horizontal line 17. If the matrix is located in a succeeding stage of a switching network, the holding potential will be derived from a preceding stage as will become evident from the following description.

The operation of the switching matrix of FIG. 1 will be described by briefly outlining the steps necessary to establish a direct connection between input terminal 10 and output terminal 22. A control pulse is applied from a suitable source to respective terminals 12 and 24. The control pulses cause current to pass through diode 35 and relay pull coil 36, thereby activating the pull coil and closing relay contacts 39 and 40. With the closure of relay contacts 39, the holding potential from the source $E_1$ is applied via terminal 11 to the relay hold coil 37 and current flows through line 17 and hold coil 37 to ground, thereby activating the relay hold coil 37. With the hold coil activated, relay control of the contacts passes from the pull coil to the hold coil, and the contacts remain closed even though the pull pulse current no longer passes through pull coil 36. The potential developed across hold coil 37 is transmitted via diode 38 to line 29 and then to output terminal 23, where the holding potential is applied to a succeeding stage of the network. Thus, a direct connection has been made between terminal 10 and terminal 22 to provide a transmission path therebetween, and a hold potential $E_1$ has been applied via diode 38 to output terminal 23 from which it can be applied to a succeeding stage. Connections between other output and input terminals are made similarly.

In FIG. 2 there is shown a switching matrix of the type disclosed in copending application, Ser. No. 444,139 dated Mar. 21, 1965, entitled "Switching Circuits," and assigned to the assignee of the present invention, modified to incorporate the present invention. Again, for simplicity, only a 2 x 2 matrix is shown, but it is evident that the invention may be utilized with any M x N matrix. As in the matrix of FIG. 1, this matrix also consists of two sets of horizontal lines and vertical lines, each of the sets consisting of three lines, with the two sets of horizontal lines intersecting the two sets of vertical lines in four places to provide four possible transmission paths through the matrix. For example, horizontal lines 51, 52 and 53 intersect vertical lines 61, 62 and 63 to provide a possible transmission path between input terminal 54 and output terminal 64. A source of hold potential $E_2$ is applied to input terminal 55. At the intersection of the aforementioned sets of horizontal and vertical lines is a switching circuit consisting of a set of relay contacts 79 connected between lines 51 and 61, a resistor connected between lines 53 and 63, a latching type semiconductor device such as a silicon-controlled-rectifier (SCR) 74, the cathode of which is connected directly to line 52, and a relay control coil 70 connected between the anode of the SCR and a point of ground reference potential 72. In addition, the circuit contains a resistor 75 connected between the cathode and gate electrodes of the SCR 74, a capacitor 78 connected between line 56 and the cathode electrode of the SCR, a second capacitor 77 connected between lines 63 and the gate electrode of the SCR, a diode 71 and a resistor 69 connected in parallel with each other and also connected in parallel with the relay control coil 70, a diode 73 connected between the anode of the SCR and line 62, and diodes 67 and 68 connected into line 63 to permit only unidirectional current flow in line 63.

The matrix operates as follows to establish a transmission path, for example, between input terminal 54 and output terminal 64. Control pulses of sufficient magnitude are applied to terminals 56 and 66, respectively, causing a potential to be developed across resistor 76 and charging capacitors 77 and 78. The charge on the capacitors is reflected as a potential difference between the gate and cathode electrodes of SCR 74, thereby establishing carriers in the SCR, resulting in an initial current flow therethrough. The instantaneous current through the SCR initially flows through resistor 69, so the back EMF of the relay coil 70 does not oppose the current int he SCR. With the hold potential $E_2$ applied via resistor 57 to the cathode of the SCR, anode-to-cathode current flows in the SCR. As the current through the SCR increases, the back EMF of the relay coil is overcome and more SCR current flows through the coil until the current reaches the level sufficient to activate the relay, thereby closing relay contacts 79 and establishing the desired transmission path between terminals 54 and 64. The potential at the anode of SCR 74 is transmitted via diode 73 to line 62 and output terminal 65, from which its potential is applied to a matrix in a succeeding stage of the switching network. If the matrix of FIG. 2 is not in the first stage of a switching network, the holding potential would be derived from a matrix in the preceding stage, rather than directly from the source.

Figure 3:
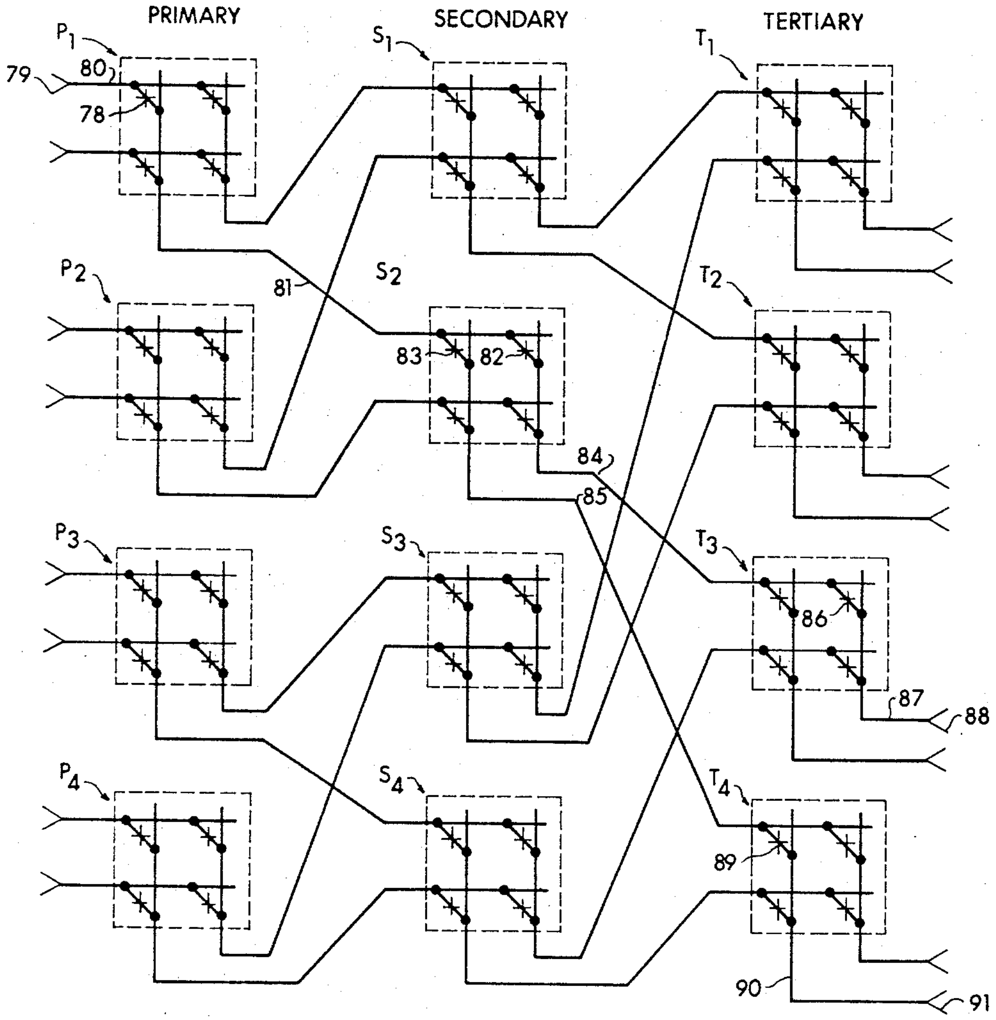
FIG. 3 is a diagrammatic representation of a three stage switching network embodying the invention.

FIG. 3 is a diagrammatic representation of a three stage switching network in which the invention has particular utility, and wherein the matrices of FIG. 1 or FIG. 2, or modifications thereof, are utilized. For simplicity of illustration, each line shown represents a set of conductors. For example, line 80 might represent lines 16, 17 and 18 of FIG. 1, or lines 51, 52 and 53 of FIG. 2. In the network of FIG. 3, the primary stage comprises four 2 x 2 matrices, P1, P2, P3, and P4, which are interconnected with the four 2 x 2 matrices S1, S2, S3, and S4 of the secondary stage of the network. The four matrices of the secondary stage are, in turn, interconnected with four 2 x 2 matrices, T1, T2, T3, and T4 of the tertiary stage. It is noted that a vertical line in a matrix of a succeeding stage, e.g., line 81, represents a vertical set of lines in matrix P1 and a horizontal set of lines in matrix S2.

The switching network of FIG. 3 provides a unique path from a given input terminal in the primary stage to a given output terminal in the tertiary stage, for example, the unique path from terminal 79 of P1 to terminal 88 of T3 via line 80 in P1 through the relay contacts 78 to line 81 in S2, and then through relay contacts 82 to line 84 in T3, through relay contacts 86 to line 87 and terminal 88. In a similar manner, the unique path from input terminal 79 to the output terminal 91 in T4 is the same as the above-described path until matrix S2 is reached, where the path to terminal 91 goes through relay contacts 83 to line 85 in T4 and through relay contacts 89 to line 90 and terminal 91. By having both these paths established at the same time, a conferencing connection is available whereby the parties connected to terminals 79, 88 and 91 are able to converse simultaneously. The present invention provides an efficient means for establishing such a connection, which will become more readily apparent by referring to FIGS. 4 and 5 and the following description.

Figure 4:
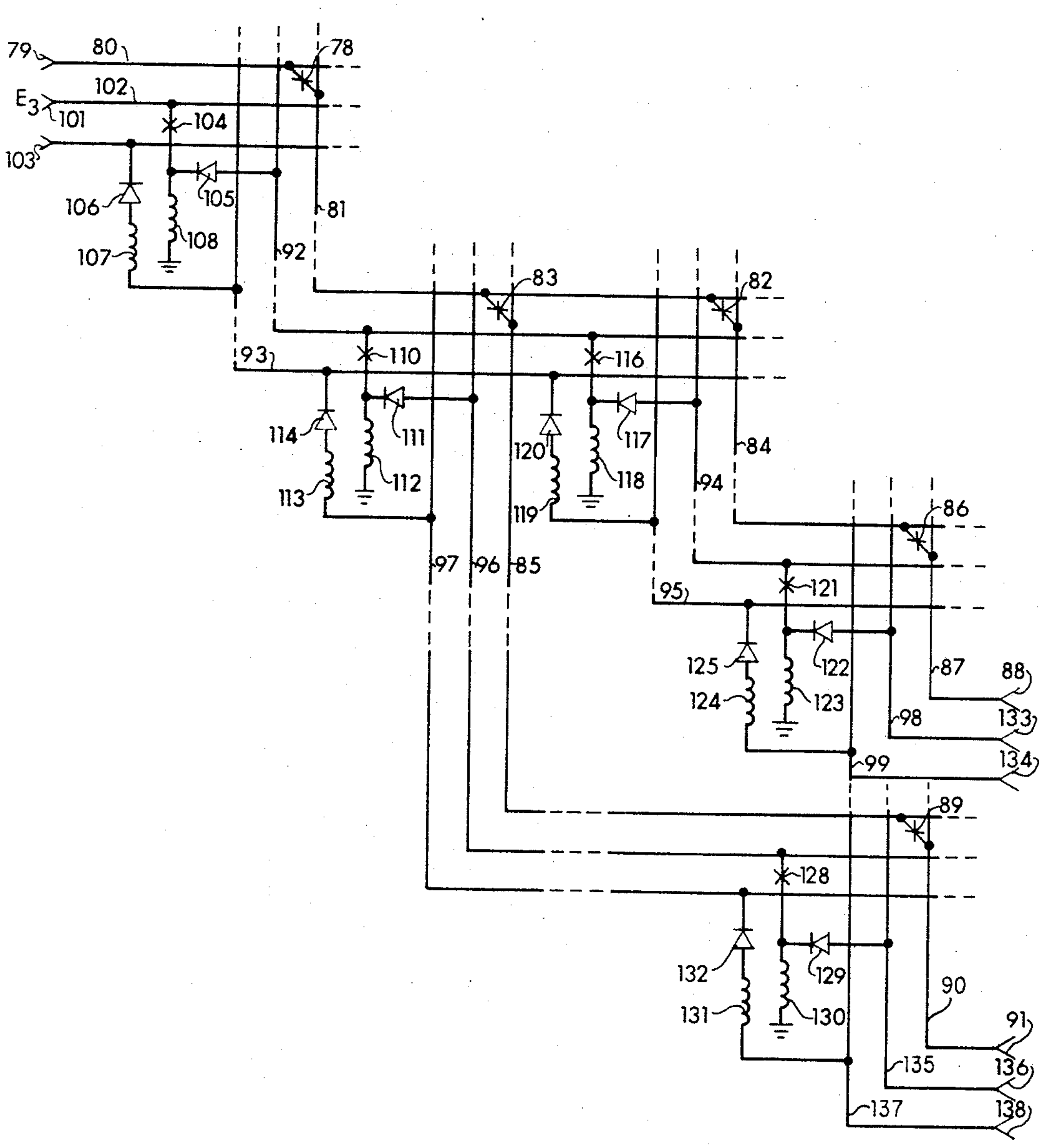
FIG. 4 is a partial schematic circuit diagram of a three stage switching network forming switched conferencing paths in the network.

The switching network shown in partial schematic form in FIG. 4, employs switching matrices of the type illustrated in FIG. 1; that is, switching matrices utilizing relays having separate pull and hold coils. For simplicity only the relays and associated circuitry necessary to establish the desired conference conection are shown. In establishing conference connections between terminals 79, 88 and 91, "pull" signal pulses are first applied between input terminal 103 and output terminal 134, thereby causing current to pass through relay pull coils 107, 119, and 124. This current activates the relays associated with the relay pull coils and closure of relay contacts 78, 104, 82, 116, 86 and 121 is effected. With the closure of relay contacts 104, 116 and 121 the hold potential $E_3$ is applied via terminal 101 through the closed relay contacts 104 to hold coil 108. The hold potential is further applied through diode 105 and relay contacts 116 to the hold coil 118, and still further is applied through diode 117 and relay contacts 121 to the hold coil 123. Therefore, hold coils 108, 118 and 123 have current passing through them and control of the relays is transferred from the pull coils to the hold coils.

Having established a direct connection between terminals 79 and 88, the next step is to apply "pull" signal pulses between input terminal 103 and output terminal 138, which causes current to flow through the pull coils 107, 113, 131 and their respective series diodes 106, 114 and 132. With the current passing through these pull coils, the relay contacts 83, 110, 89, and 128 become closed, it being remembered that relay contacts 78 and 104 are already closed because of the previously established connection. The hold potential existing across hold coil 108 is applied via diode 105 and relay contacts 110 to hold coil 112, and is further applied through diode 111 via relay contacts 128 to the hold coil 130. This results in current passing through the hold coils 112 and 130 thereby permitting these relays to be held in a closed contact state, and completes the desired conference connection between terminals 79, 88 and 91.

In this network connection, the hold potential is applied only to the hold lines of the matrices in the primary switching stage, i.e., line 102, the hold potential thereafter being transmitted via diodes and relay contacts to the succeeding stages. As is evident from the foregoing description, each hold coil conducts a single hold current, since they are connected in parallel, thereby permitting the use of standard relays.

Figure 5:
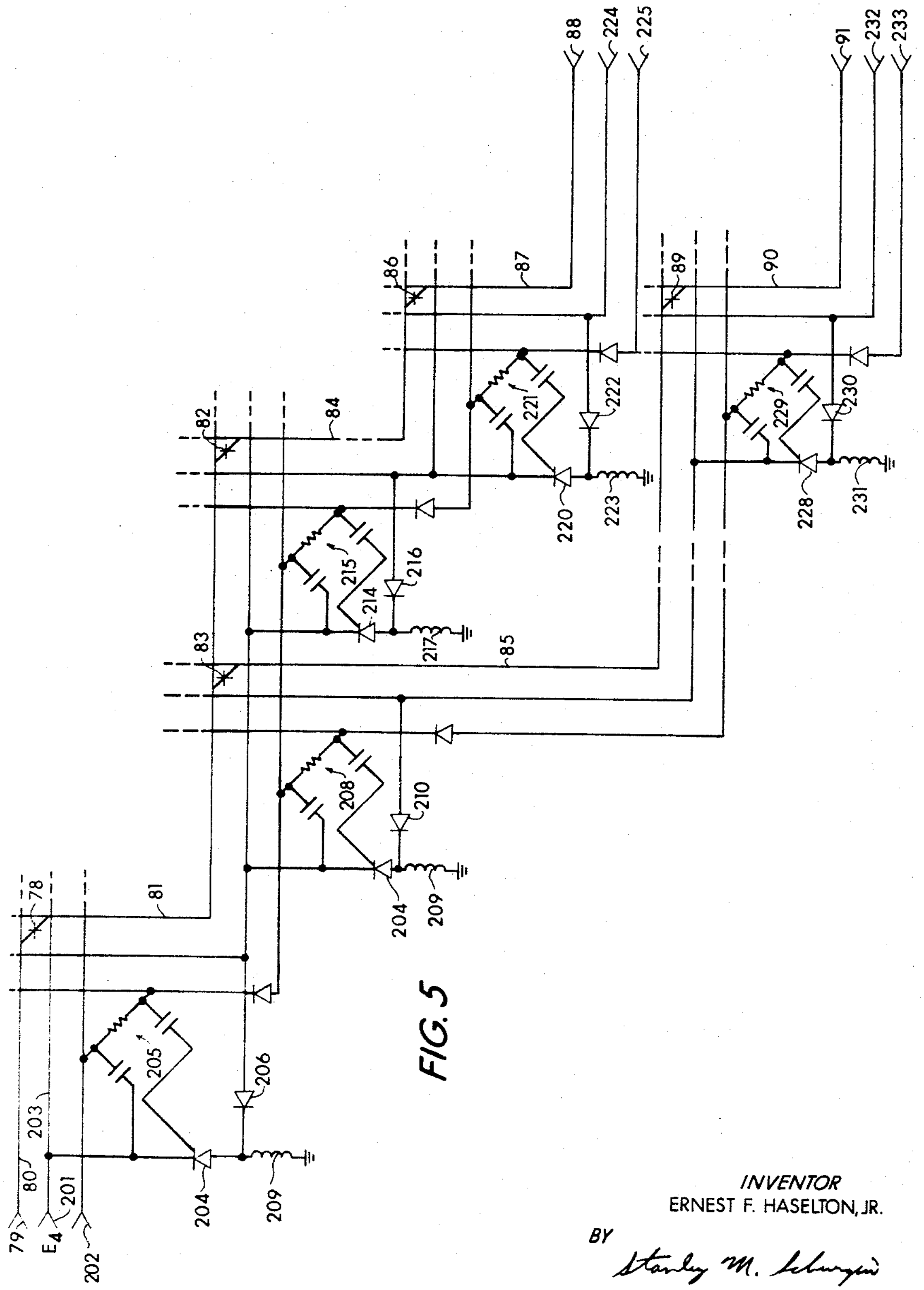
FIG. 5 is a partial schematic circuit diagram of an alternate three stage switching network forming switched conferencing paths in the network.

The switching network shown in partial schematic form in FIG. 5 illustrates the implementation of the present invention with switching matrices of the type shown in FIG. 2. To establish a conferencing connection between terminals 79, 88 and 91 using a switching network employing these switching matrices, control pulses of sufficient amplitude and duration are first applied to input terminal 202 and output terminal 233. These control pulses are divided across the RC network 205, 208 and 229, thereby activating SCR's 204, 207 and 228 respectively, causing these SCR's to go into conduction. The holding potential $E_4$ is applied via terminal 201 to line 203 and the cathode electrode of SCR 204 causing current to flow through SCR 204 and the relay hold coil 209 thereby effecting the closure of relay contacts 78. The holding potential is simultaneously applied via diode 206 to the cathode of the SCR 207, again causing current to flow through the SCR and the relay hold coil 209, causing the closure of the relay contacts 83. The hold potential is further applied via the diode 210 to the cathode electrode of the SCR 228 causing current to flow through the SCR and the relay control coil 231 and the relay contacts 89 are closed, thereby completing the direct connection between input terminal 79 and 91.

Next, control pulses are applied between terminals 202 and 225, which in a similar fashion activate the SCR's 214 and 220, it being remembered that SCR 204 is already in conduction from the previously applied control pulses. Therefore, the potential at the relay coil 209 is transmitted via the diode 206 to the cathode of SCR 214 causing current to flow through the relay coil 217 which effects the closure of relay contacts 82. The potential is further applied via the diode 216 to the cathode of SCR 220, which is rendered conducting with current passing through the relay coil 223 causing the closing of relay contacts 86. This completes the connection between terminals 79 and 88, and with previously established connection between terminals 79 and 91, the conference connection is completed.

From the foregoing description, it is apparent that the invention provides a switching system having built-in conferencing capability. While the illustrative embodiments have been described as establishing a two path conferencing connection, it is readily apparent that three or more paths could be established, the only practical limitation being determined by the load handling capability of terminal equipment connected to the switching system. It is further apparent that the invention is useful in systems wherein each selected matrix is individually controlled, as, for example, in the switching network described in the above-identified copending application. In such a system it may be desirable to simultaneously establish a multiplicity of transmission paths, rather than sequentially establishing such paths as described in the foregoing illustrative embodiments. Still further, it is readily apparent that the invention is not limited to use in communication switching systems, but may be utilized in any switching environment where it is desired to accomplish a conferencing function.

What is claimed is:

1. In a switching network containing a multiplicity of intersections of horizontal and vertical line groups connected between a plurality of input terminals and a plurality of output terminals to form transmission paths therebetween, whereby a given transmission path between a selected input terminal and a selected output terminal is provided by energizing a plurality of relays associated with a like plurality of intersections of horizontal and vertical line groups and wherein each relay contains a control coil, means for connecting in parallel each of the relay control coils in said given transmission path comprising:

means connecting said relay control coil between a selected line in the horizontal line group and a point of reference potential; and a diode connected between said relay coil and a selected line in the vertical line group.

2. The invention according to claim 1, wherein the means connecting said relay control coil between a selected line in the horizontal line group and a point of reference potential comprises:

first and second terminals;

a set of relay contacts associated with said relay, said set of relay contacts connected between said first and second terminals;

means connecting said first terminal to the selected line in the horizontal line group; and means connecting said relay control coil between said second terminal and said point of reference potential.

3. The invention according to claim 1, wherein the means for connecting said relay control coil between a selected line in the horizontal line group and a point of reference potential comprises:

a latching semiconductor device having input, output and gate terminals;

means connecting the input terminal of said latching semiconductor device to the selected line in the horizontal line group;

means connecting said relay control coil between the output terminal of said latching semiconductor device and said point of reference potential; and means for applying a gating signal to the gate terminal of said latching semiconductor device.

4. The invention according to claim 3, wherein said latching semiconductor device is a silicon-controlled-rectifier having cathode, anode and gate electrodes corresponding, respectively, to said input, output and gate terminals.

5. In a switching network comprising a plurality of switching matrix groups, each containing a plurality of switching matrices each of which includes relays to maintain crosspoint connections between input and output line groups, each relay having at least one control coil and each line group containing at least one control line, wherein a plurality of input lines are connected to the input line groups of the switching matrices in the first group of said matrix groups and a plurality of output lines are connected to the output line groups of the switching matrices in the last group of said matrix groups, and said matrix groups are interconnected to provide a multiplicity of transmission paths between the input and output lines, a selected transmission path being established by providing a crosspoint connection in one matrix in each of said matrix groups, means for connecting in parallel the relay control coils in each of said selected matrices, comprising:

means connecting the relay control coil between the input control line of the selected input line group of said matrix and a point of reference potential; and a diode connected between the relay control coil and the output control line of the selected output line group of said matrix.

6. In a switching matrix employing relays, each having at least one control coil to maintain crosspoint connections between input and output line groups wherein each line group contains at least one control line, means for connecting in parallel said relay control coil, comprising:

means connecting the relay control coil between the input control line of the selected input line group and a point of reference potential; and a diode connected between the relay control coil and the output control line of the selected output line group.

7. In a switching matrix employing relays having separate pull and hold coils to establish crosspoint connections, means for connecting in parallel the hold coils of the relays between selected input and output line groups, comprising:

means connecting the relay hold coil between an input line and a point of reference potential; and a diode connected between the relay hold coil and the output line of the selected output line group.

8. In a switching matrix wherein a plurality of input line groups intersects a plurality of output line groups to provide a multiplicity of transmission paths through the matrix and wherein each line group contains at least first and second control lines and one transmission line, control means associated with each of the intersections so formed, each of said control means comprising:

a relay having first and second control coils, first, second, third and fourth terminals, a first set of relay contacts connected between said first and second terminals and a second set of relay contacts connected between said third and fourth terminals;

means connecting the first control coil of said relay between the first control lines of the selected input and output line groups;

means connecting the first terminal of said relay to the second control line of the selected group of said plurality of input line groups;

means connecting the second control coil of said relay between the second terminal of said relay and a point of reference potential;

means connecting the third and fourth terminals of said relay between the transmission lines in the selected groups of said pluralities of input and output line groups, respectively; and a diode connected between the second terminal of said relay and the second control line of the selected group of said plurality of output line groups.

9. In a switching matrix wherein a plurality of input line groups intersect a plurality of output line groups to provide a multiplicity of transmission paths through the matrix, and wherein each line group contains at least first and second control lines and one transmission line, control means associated with each of the intersections so formed, each of said control means comprising:

a relay having a control coil, first and second terminals and a set of relay contacts connected between said first and second terminals;

a latching semiconductor device having input, output and gate terminals;

a gating network having first, second, third and fourth terminals;

means connecting the control coil of said relay between the output terminal of said latching semiconductor device and a point of reference potential;

means connecting the first and second terminals of said gating network to the first control lines of the selected groups of said pluralities of input and output line groups, respectively;

means connecting the input terminal of said latching semiconductor device and the third terminal of said gating network to the second control line of the selected group of said plurality of input line groups;

means connecting the gate terminal of said latching semiconductor device to the fourth terminal of said gating network;

means connecting the first and second terminals of said relay to the transmission lines of the selected groups of said pluralities of input and output line groups, respectively; and a diode connected between the output terminal of said latching semiconductor device and the second control line of the selected group of said plurality of output line groups.

10. The invention according to claim 9, wherein said latching semiconductor device is a silicon-controlled-rectifier having cathode, anode and gate electrodes corresponding, respectively, to said input, output and gate terminals.

References Cited

UNITED STATES PATENTS

| | | | |
|---|---|---|---|
| 3,175,043 | 3/1965 | Jabczynski et al. | 179—22 |
| 3,176,273 | 3/1965 | Deller et al. | 340—166 |
| 3,182,226 | 5/1965 | Peek. | |

DONALD J. YUSKO, *Primary Examiner.*

U.S. Cl. X.R.

179—18